United States Patent
Luo et al.

(10) Patent No.: US 12,470,074 B2
(45) Date of Patent: Nov. 11, 2025

(54) DATA LINE AND CHARGING DEVICE

(71) Applicant: VIVO MOBILE COMMUNICATION CO., LTD., Dongguan (CN)

(72) Inventors: Fangding Luo, Dongguan (CN); Junchen Wei, Dongguan (CN); Yanbin Liu, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 603 days.

(21) Appl. No.: 18/070,601

(22) Filed: Nov. 29, 2022

(65) Prior Publication Data

US 2023/0101461 A1    Mar. 30, 2023

Related U.S. Application Data

(63) Continuation of application No. PCT/CN2021/096696, filed on May 28, 2021.

(30) Foreign Application Priority Data

May 29, 2020    (CN) .................. 202010478123.1

(51) Int. Cl.
     *G06F 3/06*      (2006.01)
     *H02J 7/00*      (2006.01)

(52) U.S. Cl.
     CPC ........ *H02J 7/00045* (2020.01); *H02J 7/0042* (2013.01); *H02J 2207/30* (2020.01)

(58) Field of Classification Search
None
See application file for complete search history.

(56) References Cited

U.S. PATENT DOCUMENTS

| | | | |
|---|---|---|---|
| 2017/0344508 A1 | 11/2017 | Setiawan et al. | |
| 2019/0197009 A1 | 6/2019 | Chen et al. | |
| 2019/0278731 A1* | 9/2019 | Mattos .................. | G06F 1/3215 |

FOREIGN PATENT DOCUMENTS

| | | |
|---|---|---|
| CN | 105740193 A | 7/2016 |
| CN | 105790356 A | 7/2016 |
| CN | 106033400 A | 10/2016 |

(Continued)

OTHER PUBLICATIONS

International Search Report issued in corresponding International Application No. PCT/CN2021/096696, mailed Aug. 12, 2021, 6 pages.

(Continued)

*Primary Examiner* — Scott C Sun
(74) *Attorney, Agent, or Firm* — IPX PLLC

(57) ABSTRACT

A data line and a charging device are provided. The data line includes a Type-A port, a first port, a cable, and a circuit identification module. VBUS pins, D+ pins, D− pins, and GND pins in the Type-A port and the first port are connected in one-to-one correspondence. The circuit identification module includes a pull-up resistor, a switch circuit, and a detection circuit. A first terminal of the switch circuit is connected to the CC pin of the first port, a second terminal is connected to the VBUS pin through the pull-up resistor, a third terminal is connected to the CC pin of the Type-A port, an input terminal of the detection circuit is connected to the CC pin of the Type-A port, and an output terminal is connected to a control terminal of the switch circuit.

18 Claims, 2 Drawing Sheets

(56) References Cited

FOREIGN PATENT DOCUMENTS

| | | |
|---|---|---|
| CN | 106992372 A | 7/2017 |
| CN | 108054818 A | 5/2018 |
| CN | 108206444 A | 6/2018 |
| CN | 108233130 A | 6/2018 |
| CN | 207517932 U | 6/2018 |
| CN | 207691160 U | 8/2018 |
| CN | 208158154 U | 11/2018 |
| CN | 110380721 A | 10/2019 |
| CN | 110534988 A | 12/2019 |
| CN | 209844612 U | 12/2019 |
| CN | 210129644 U | 3/2020 |
| CN | 111130596 A | 5/2020 |
| CN | 111509814 A | 8/2020 |
| CN | 111509815 A | 8/2020 |
| CN | 111509817 A | 8/2020 |
| CN | 111817386 A | 10/2020 |
| KR | 20170037006 A | 4/2017 |

OTHER PUBLICATIONS

First Office Action issued in related Chinese Application No. 202010478123.1, mailed Apr. 23, 2021, 8 pages.
Second Office Action issued in related Chinese Application No. 202010478123.1, mailed Oct. 15, 2021, 9 pages.
Office Action issued in related Korean Application No. 10-2022-7046046, mailed Mar. 4, 2025, 8 pages.
Examination report issued in related Indian Application No. 202217075939, mailed Feb. 28, 2025, 5 pages.
Extended European Search Report issued in related European Application No. 21813029.2, mailed Jul. 25, 2024, 9 pages.

\* cited by examiner

DATA LINE AND CHARGING DEVICE

CROSS-REFERENCE TO RELATED APPLICATIONS

This application is a continuation of International Application No. PCT/CN2021/096696, filed May 28, 2021, which claims priority to Chinese Patent Application No. 202010478123.1, filed May 29, 2020. The entire contents of each of the above-referenced applications are expressly incorporated herein by reference.

TECHNICAL FIELD

This application relates to the field of communication technologies, specifically, to a data line and a charging device.

BACKGROUND

With the development of science and technology, fast charging is more widely applied.

In the related art, a Power Delivery (PD) protocol is usually used for fast charging. Chargers supporting PD protocol charging need to perform communication by using a Configuration Channel (CC) signal line, and the chargers supporting PD protocol charging often use a third standard (Type-C) port in combination with a Type-C to Type-C data line. A data line using a first standard (Type-A or Standard-A) port performs communication by using a D+/D− signal line and cannot support PD protocol charging. However, the data line with the Type-A port is currently the most widely used data line. As a result, Type-A ports on conventional data lines do not support PD protocol charging.

SUMMARY

The embodiments of this application provide a data line and a charging device.

According to a first aspect, the embodiments of this application provide a data line, where the data line includes a Type-A port and a first port, where the Type-A port and the first port are connected by a cable, both the Type-A port and the first port include VBUS pins, CC pins, D+ pins, D− pins, and GND pins, and the VBUS pins, the D+ pins, the D− pins, and the GND pins in the Type-A port and the first port are connected in a one-to-one correspondence; and the data line is provided with a circuit identification module, the circuit identification module includes a pull-up resistor, a switch circuit, and a detection circuit, where a first terminal of the switch circuit is connected to the CC pin of the first port, a second terminal of the switch circuit is connected to a first terminal of the pull-up resistor, a third terminal of the switch circuit is connected to the CC pin of the Type-A port, a second terminal of the pull-up resistor is connected to the VBUS pin of the first port, an input terminal of the detection circuit is connected to the CC pin of the Type-A port, and an output terminal of the detection circuit is connected to a control terminal of the switch circuit, where under the control of the detection circuit, the first terminal of the switch circuit is connected to the second terminal or the third terminal of the switch circuit.

According to a second aspect, the embodiments of this application provide a charging device, where the charging device includes a data line and a charger, the data line is the data line according to the first aspect, the charger includes a Type-A female socket matching the Type-A port of the data line, and the Type-A female socket includes: a VBUS pin, a CC pin, a D+ pin, a D− pin, and a GND pin.

In the embodiments of this application, the CC pin is arranged in the Type-A port of the data line for the detection circuit to detect whether there is a signal on the CC pin of the Type-A port, generate a control signal according to a detection result, and control a switch status of the switch circuit according to the control signal. Therefore, when the first terminal and the second terminal of the switch circuit are connected, the CC pin of the Type-A port is disconnected from the CC pin of the first port, so that the data line can perform only non-PD protocol communication through the D+ pin and the D− pin. When the first terminal and the third terminal of the switch circuit are connected, the CC pin of the Type-A port is connected to the CC pin of the first port, so that the data line can support non-PD protocol communication through the D+ pin and the D− pin and support PD protocol communication through the CC pin, and the data line with the Type-A port can support PD protocol charging.

DETAILED DESCRIPTION

The following clearly describes the technical solutions in the embodiments of this application with reference to the accompanying drawings in the embodiments of the present application. Apparently, the described embodiments are some of the embodiments of this application rather than all of the embodiments. All other embodiments obtained by a person of ordinary skill in the art based on the embodiments of this application without creative efforts shall fall within the protection scope of this application.

The specification and claims of this application, and terms "first" and "second" are used to distinguish similar objects, but are unnecessarily used to describe a specific sequence or order. It should be understood that the data termed in such a way are interchangeable in appropriate circumstances, so that the embodiments of this application described herein can be implemented in orders other than the order illustrated or described herein. In addition, "and/or" in this specification and the claims represents at least one of the connected objects, the character "/" generally represents an "or" relationship between the associated objects.

A data line and charging device provided in the embodiments of this application are described in detail below with reference to the accompanying drawings by using embodiments.

Figure 1:
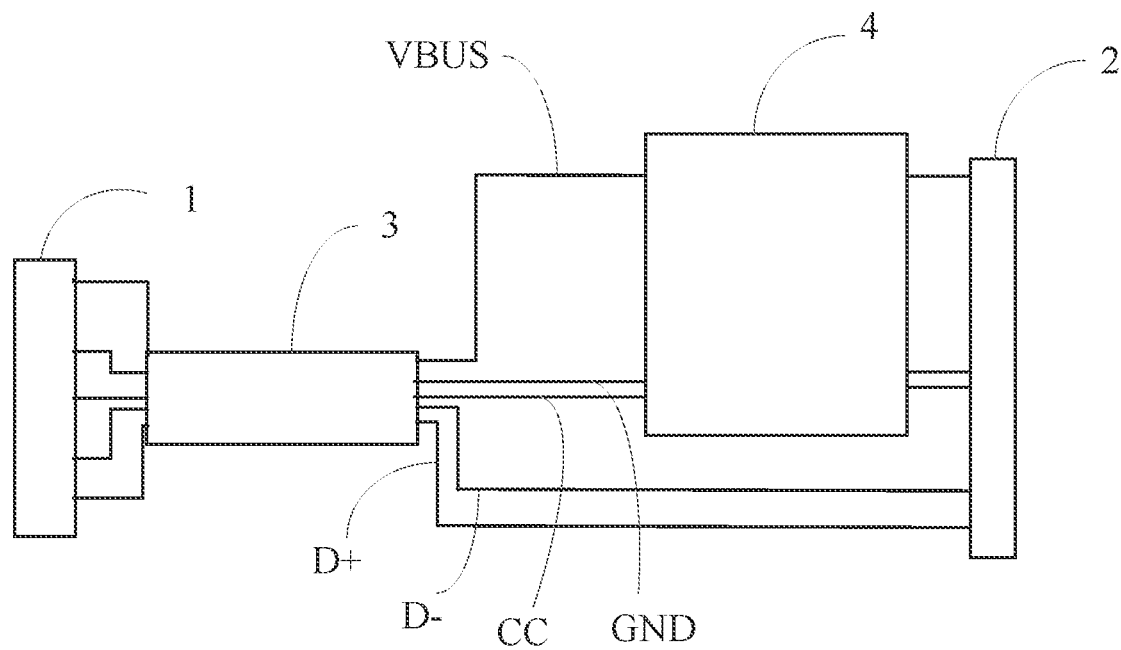
FIG. 1 a structure of a data line according to an embodiment of this application.
Figure 2:
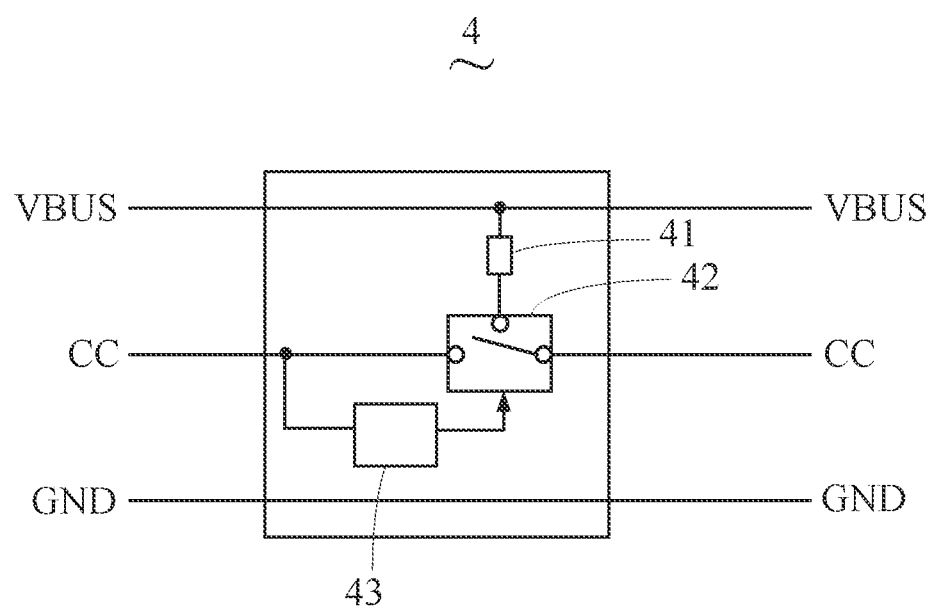
FIG. 2 is a structural diagram of an identification module in a data line according to an embodiment of this application.

Referring to FIG. 1 and FIG. 2, FIG. 1 is a structure of a data line according to an embodiment of this application; and FIG. 2 is a structural diagram of an identification module in a data line according to an embodiment of this application.

The data line includes: a Type-A port 1 and a first port 2, the Type-A port 1 and the first port 2 are connected by a cable 3, both the Type-A port 1 and the first port 2 include VBUS pins, CC pins, D+ pins, D− pins, and GND pins, and the VBUS pins, the D+ pins, the D− pins, and the GND pins in the Type-A port 1 and the first port 2 are connected in a one-to-one correspondence.

The data line is provided with a circuit identification module 4, where the circuit identification module 4 includes a pull-up resistor 41, a switch circuit 42, and a detection circuit 43. A first terminal of the switch circuit 42 is connected to the CC pin of the first port 2, a second terminal of the switch circuit 42 is connected to a first terminal of the pull-up resistor 41, a third terminal of the switch circuit 42 is connected to the CC pin of the Type-A port 1, a second terminal of the pull-up resistor 41 is connected to the VBUS pin in the first port 2, an input terminal of the detection circuit 43 is connected to the CC pin of the Type-A port 1, and an output terminal of the detection circuit 43 is connected to a control terminal of the switch circuit 42.

Under the control of the detection circuit 43, the first terminal of the switch circuit 42 is connected to the second terminal or the third terminal of the switch circuit 42.

In the prior art, mobile terminals such as mobile phones often support fast charging of DP and DM communication protocols, and the Data Minus (DM) signal charging communication protocol and the data positive signal charging communication protocol transmit communication signal by using a D+ pin and a D− pin, while electronic devices such as notebooks support fast charging of the DP communication protocol, and the PD communication protocol transmits a communication signal by using a CC pin. In the prior art, data lines that support the PD communication protocol are all data lines in the form of Type-C to Type-C, and data lines that support the DP/DM communication protocols are all data lines in the form of Type-A to Type-C, so that the data lines supporting the PD communication protocol and the data lines supporting the DP/DM communication protocol cannot be used universally.

In this implementation, the data line is a data line including the Type-A port 1, and a CC pin is added to the Type-A port 1, and when a signal of a CC communication protocol is transmitted on the CC pin, the CC pin of the Type-A port 1 is connected to the CC pin of the first port 2, so that PD fast charging can be performed on a device to be charged. In addition, in this implementation, the first port 2 may be a Type-C port, to connect the data line and a device to be charged having a Type-C socket.

With the development of science and technology, the first port 2 may further be an existing port or another port that may appear in the future, which is not specifically limited herein.

In addition, in actual application, in a case that the device to be charged supports only non-PD fast charging of the DP and DM communication protocols, DP and DM communication channels on the data line are still in an on state, so that fast charging of the DP and DM protocols can be performed on the device to be charged.

It should be noted that, in a case that the first terminal of the switch circuit 42 is connected to the second terminal of the switch circuit 42, the first terminal of the switch circuit 42 is disconnected from the third terminal of the switch circuit 42; and in a case that the first terminal of the switch circuit 42 is connected to the third terminal of the switch circuit 42, the first terminal of the switch circuit 42 is disconnected from the second terminal of the switch circuit 42.

In addition, during operation, in a case that the data line is not connected to a power supply, the first terminal of the switch circuit 42 may be connected to the third terminal of the switch circuit 42, so that when the data line is inserted into a device to be charged, the data line performs CC communication with the device to be charged by using the PD communication protocol channel, and within a preset time of the CC communication, in a case that the CC pin of the Type-A port obtains a CC communication signal, the first terminal of the switch circuit 42 is switched to be connected to the second terminal of the switch circuit 42. The preset time may be 3 seconds, 5 seconds, or the like, which is not specifically limited herein.

In addition, a connection relationship between the VBUS pins, the D+ pins, the D+ pins, the D− pins, and the GND pins in the Type-A port 1 and the first port 2 and wires in the cable 3 is the same as a connection relationship between pins and wires in the prior art. For example, in a case that the first port 2 is a Type-C port, the connection relationship between pins in the Type-C port and the Type-A port 1 and the wires in cable 3 is a connection relationship shown in Table 1.

TABLE 1

| Type-C port | Cable | Type-A port |
|---|---|---|
| GND pin | GND wire | GND pin |
| VBUS pin | VBUS wire | VBUS pin |
| CC1 pin | CC1 wire | CC pin |
| CC2 pin | | |
| D+ pin | D+ wire | D+ pin |
| D− pin | D− wire | D− pin |

During implementation, in a case that the CC pin of the Type-A port 1 receives a CC communication signal, the CC communication signal is converted into a stable control signal by using the detection circuit 43, so that when there is a signal on the CC pin of the Type-A port 1, the detection circuit 43 outputs a first control signal, and when there is no signal on the CC pin of the Type-A port 1, the detection circuit 43 outputs a second control signal. Therefore, the outputted first control signal and the outputted second control signal are more accurate, and a switch status of the switch circuit 42 can be controlled more accurately according to the first control signal and the second control signal.

For example, in a case that there is a signal on the CC pin of the Type-A port 1, the control signal outputted by the detection circuit 43 may be a high-level first control signal, so that the switch circuit 42 connects the first terminal and the third terminal thereof in response to the first control signal; and in a case that there is no signal on the CC pin of the Type-A port 1, the control signal outputted by the detection circuit 43 may be a low-level second control signal, so that the switch circuit 42 connects the first terminal and the second terminal thereof in response to the second control signal.

During an exemplary implementation, the detection circuit 43 may further convert the CC communication signal received by the CC pin of the Type-A port 1 into a digital control signal, and the switch circuit 42 is set to a digital control switch, so that a structure and a control logic of the switch circuit 42 can be simplified.

In this implementation, the CC pin is arranged in the Type-A port, a communication signal transmitted on the CC pin of the Type-A port is converted into a control signal by using the detection circuit, to control connection or disconnection between the CC pin and the CC pin of the first port, so that in a case that there is a signal on the CC pin of the Type-A port, the CC pin can be controlled to be connected to the CC pin of the first port. Therefore, a PD communication channel in the data line is connected, to support PD fast charging. In a case that there is no signal on the CC pin of the first Type-A port, the CC pin is controlled to be disconnected from the CC pin of the first port, so that the PD communication channel in the data line is disconnected. In this case, the PD fasting charging is not supported. In this way, in a case that the device to be charged connected to the data line supports PD fast charging, the PD communication channel in the data line can be connected, and PD fast charging can be performed on the device to be charged. In a case that the device to be charged connected to the data line does not support the PD fast charging, the PD communication channel in the data line is disconnected, and the DP communication channel and the DM communication channel are always connected, so that fast charging of the DP/DM communication protocol is performed on the device to be charged.

In an exemplary implementation, the circuit identification module 4 is arranged in the cable 3, and a distance between the circuit identification module 4 and one end of the first port 2 is less than a distance between the circuit identification module and one end of the Type-A port 1.

In this implementation, the identification module 4 is arranged in the cable 3, to switch a corresponding connection relationship between the CC pin of the Type-A port 1 and the CC pin of the first port 2 is switched in the cable 3.

In addition, the distance between the circuit identification module 4 and one end of the first port 2 is less than the distance between the circuit identification module and one end of the Type-A port 1, and the identification module 4 may be arranged close to the first port 2, so that a problem that arranging a circuit board structure including the identification module 4 in the middle of the cable 3 affects the smoothness and aesthetics of the cable 3 can be avoided. During an exemplary implementation, the distance between the circuit identification module 4 and one end of the first port 2 is less than the distance between the circuit identification module and one end of the Type-A port 1, and the identification module 4 may alternatively be arranged close to the Type-A port 1, so that a problem that arranging a circuit module with a relatively large diameter in the middle of the cable 3 affects the smoothness and aesthetics of the cable 3 can also be avoided.

In addition, during an exemplary implementation, in a case that the circuit identification module 4 is arranged in cable 3, the third terminal of the switch circuit 42 is connected to a CC wire in cable 3 connected to the CC pin of the Type-A port 1, the second terminal of the pull-up resistor 41 is connected to a VBUS wire in the cable 3, and the input terminal of the switch circuit 42 is connected to the CC wire in the cable 3 connected to the CC pin of the Type-A port 1. Two ends of the VBUS wire are respectively connected to the VBUS pin of the Type-A port 1 and the VBUS pin of the first port 2, and two ends of a GND wire are respectively connected to the GND pin of the Type-A port 1 and the GND pin of the first port 2.

Figure 3:
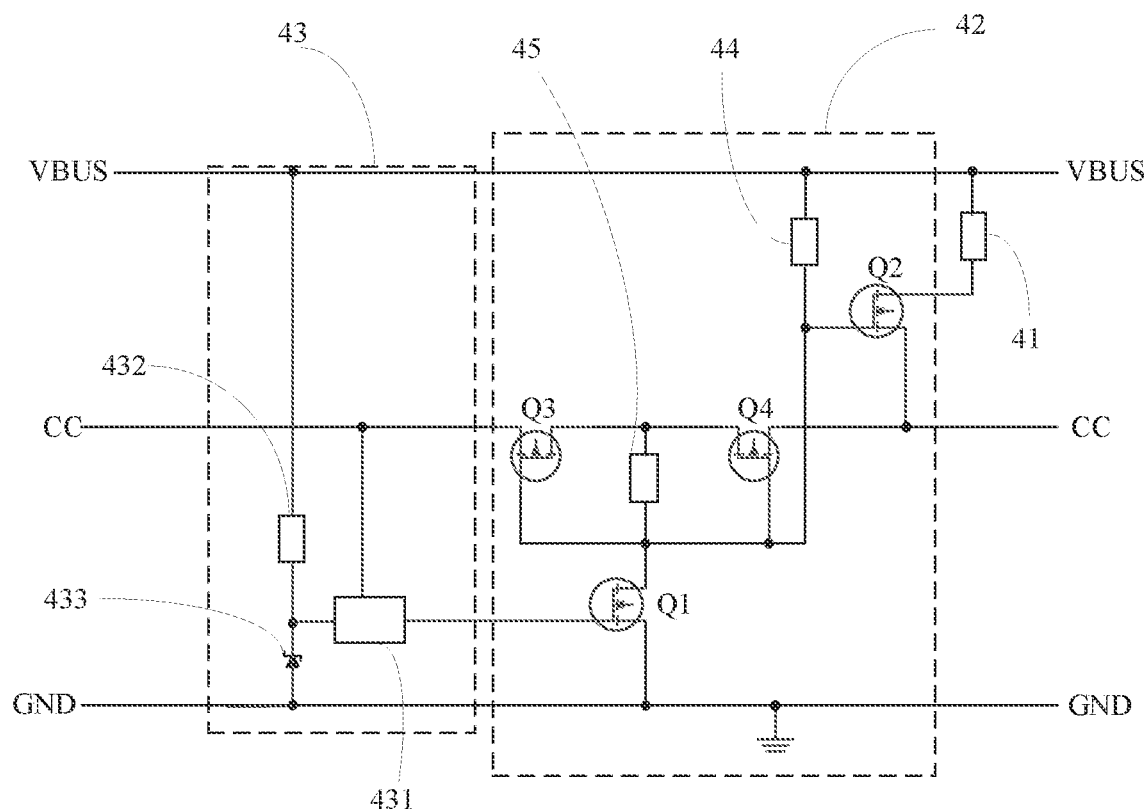
FIG. 3 is a circuit diagram of an identification module in a data line according to an embodiment of this application.

In an exemplary implementation, as shown in FIG. 3, the switch circuit 42 includes a first switch transistor Q1, a second switch transistor Q2, a third switch transistor Q3, a fourth switch transistor Q4, a first resistor 44, and a second resistor 45.

A first electrode of the first switch transistor Q1 is the control terminal of the switch circuit 42, a second electrode of the first switch transistor Q1 is connected to a first electrode of the second switch transistor Q2, a first electrode of the third switch transistor Q3, and a first electrode of the fourth switch transistor Q4, and a third electrode of the first switch transistor Q1 is connected to the GND pin of the first port 2.

The first electrode of the second switch transistor Q2 is further connected to the VBUS pin of the first port 2 through the first resistor 44, a second electrode of the second switch transistor Q2 is the second terminal of the switch circuit 42, and a third electrode of the second switch transistor Q2 is the first terminal of the switch circuit 42.

A second electrode of the third switch transistor Q3 is the third terminal of the switch circuit 42, and a third electrode of the third switch transistor Q3 is connected to the second electrode of the first switch transistor Q1 through the second resistor 45.

A second electrode of the fourth switch transistor Q4 is connected to the third electrode of the second switch transistor Q2, and a third electrode of the fourth switch transistor Q4 is connected to the third electrode of the third switch transistor Q3.

In a case that there is no signal on the CC pin of the Type-A port 1, the first switch transistor Q1, the third switch transistor Q3, and the fourth switch transistor Q4 are all in an off state, and the second switch transistor Q2 is in an on state and in a case that there is a signal on the CC pin of the Type-A port 1, the first switch transistor Q1, the third switch transistor Q3, and the fourth switch transistor Q4 are all in the on state, and the second switch transistor Q2 is in the off state.

During an exemplary implementation, in a case that a signal is transmitted on the CC pin of the Type-A port 1, the detection circuit 43 converts the signal on the CC pin of the Type-A port 1 into a high-level signal, so that when the first electrode of the first switch transistor Q1 receives the high-level signal, the first switch transistor Q1 is controlled to be on, that is, the second electrode and the third electrode of the first switch transistor Q1 are connected. In this case, the first electrode of the second switch transistor Q2, the first electrode of the third switch transistor Q3, and the first electrode of the fourth switch transistor Q4 are connected to the GND pin through the first switch transistor Q1, so that the third switch transistor Q3 and the fourth switch transistor Q4 are turned on, that is, the second electrode and the third electrode of the third switch transistor Q3 are connected, and the second electrode and the third electrode of the fourth switch transistor Q4 are connected. In addition, because the first electrode of the second switch transistor Q2 is pulled down to the GND pin by using the first switch transistor Q1, the second switch transistor Q2 is turned off, that is, the second electrode and the third electrode of the second switch transistor Q2 are disconnected.

In an implementation, the first switch transistor Q1 and the second switch transistor Q2 are N-type transistors, and the third switch transistor Q3 and the fourth switch transistor Q4 are P-type transistors. In some embodiments, the first switch transistor Q1 and the second switch transistor Q2 are N-Metal-Oxide Semiconductor (NMOS) transistors, and the third switch transistor Q3 and the fourth switch transistor Q4 are P-Metal-Oxide Semiconductor (PMOS) transistors.

During application, the first electrode of the first switch transistor Q1 may be a grid electrode, the second electrode of the first switch transistor may be a drain electrode, and the third electrode of the first switch transistor may be a source electrode. The first electrode of the second switch transistor Q2 may be a grid electrode, the second electrode of the second switch transistor may be a drain electrode, and the third electrode of the second switch transistor may be a source electrode. In this way, in a case that there is a signal on the CC pin of the Type-A port 1, the first electrode of the first switch transistor Q1 receives a high-level signal to connect the second electrode and the third electrode. In this case, the grid electrode of the second switch transistor Q2 is connected to the GND pin, so that the second switch transistor Q2 is turned off.

In addition, the first electrode of the third switch transistor Q3 and the first electrode of the fourth switch transistor Q4 are grid electrodes, and in a case that the first switch transistor Q1 is turned on, the first electrode of the third switch transistor Q3 and the first electrode of the fourth switch transistor Q4 are pulled down to the GND pin by using the first switch transistor Q1, so that the PMOS transistors Q3 and Q4 are turned on. In this case, because the first switch transistor Q1 is turned on, the first electrode of Q2 is also pulled down to the GND pin by using the first switch transistor Q1, so that the NMOS transistor Q2 is turned off.

Correspondingly, when there is no signal on the CC pin of the Type-A port I, the detection circuit 43 does not output a level signal, that is, the detection circuit 43 outputs a low-level signal, and the first electrode of the first switch transistor Q1 is turned off when receiving the low-level signal. In this case, the first electrode of the second switch transistor Q2 is pulled up to the VBUS pin by using the first resistor 44, so that the NMOS transistor Q2 is turned on, and when the first switch transistor Q1 is turned off, the first electrode of the third switch transistor Q3 and the first electrode of the fourth switch transistor Q4 are pulled up to the VBUS pin by using the first resistor 44, so that the PMOS transistors Q3 and Q4 are turned off.

During an exemplary implementation, the first switch transistor Q1, the second switch transistor Q2, the third switch transistor Q3, and the fourth switch transistor Q4 may alternatively be other types of transistors, and connection circuits of the switch transistors in the switch circuit 42 are changed accordingly, to connect or disconnect the CC pin of the Type-A port 1 and the CC pin of the first port 2 according to a control signal generated after the detection circuit 43 detects a CC signal. This is not specifically limited herein.

In addition, during an exemplary implementation, as shown in FIG. 3, the second electrode of the first switch transistor Q1 is connected to the third electrode of the third switch transistor Q3 and the third electrode of the fourth switch transistor Q4 through the fourth resistor 45.

In this way, in a case that the first electrode of the third switch transistor Q3 and the first electrode of the fourth switch transistor Q4 receive low-level signals, the third electrode of the third switch transistor Q3 and the third electrode of the fourth switch transistor Q4 can be at a low level through the fourth resistor 45, so that the third switch transistor Q3 and the fourth switch transistor Q4 are turned off.

In this implementation, the switch circuit 42 is an analog signal control circuit. Compared with a digital signal control circuit, a case that a control unit is arranged in the switch circuit 42 and a switch status of the switch circuit 42 is controlled according to a digital control signal sent by the control unit can be avoided by using the analog signal control circuit, thereby reducing the production costs of the switch circuit 42.

In an exemplary implementation, as shown in FIG. 2, the switch circuit includes a change-over switch 42, the first terminal of the switch circuit is a non-movable terminal of the change-over switch 42, and both the second terminal and the third terminal of the switch circuit are movable terminals of the change-over switch 42.

During an exemplary implementation, the change-over switch 42 may be switched according to a control signal transmitted by the detection circuit 43, and the control signal can be any one of an analog signal or a digital signal. In some embodiments, when there is a signal on the CC pin of the Type-A port 1, the detection circuit 43 sends a first control signal to the change-over switch 42, and the change-over switch 42 connects the movable terminal and the third terminal in response to the first control signal, that is, the CC pin of the first port 2 is connected to the CC pin of the Type-A port 1. When there is no signal on the CC pin of the Type-A port 1, the detection circuit 43 sends a second control signal to the change-over switch 42, and the change-over switch 42 connects the movable terminal and the second terminal in response to the second control signal, that is, the CC pin of the first port 2 is connected to the VBUS pin by using the pull-up resistor 41.

During an exemplary implementation, a control unit may further be arranged in the switch circuit, and the control unit is respectively connected to the detection circuit 43 and the change-over switch 42, so that when the detection circuit 43 detects that there is a signal on the CC pin of the Type-A port 1, a detection result is sent to the control unit, and the control unit generates a first digital control signal in response to the detection result, to control, by using the first digital control signal, the change-over switch 42 to connect the first terminal and the third terminal thereof; and when the detection circuit 43 detects that there is no signal on the CC pin of the Type-A port 1, a detection result is sent to the control unit, and the control unit generates a second digital control signal in response to the detection result, to control, by using the second digital control signal, the change-over switch 42 to connect the first terminal and the second terminal thereof.

In this implementation, the structure of the switch circuit can be simplified by arranging the change-over switch 42 in the switch circuit.

In an exemplary implementation, the detection circuit 43 is an analog-to-digital conversion circuit, or an integrator circuit.

In view of the fact that the signal transmitted on the CC pin of Type-A port 1 is often an electrical signal that fluctuates between a high level and a low level, if the switch status of the switch circuit 42 is directly controlled according to the electrical signal, the switch circuit 42 is switched frequently, and when a low-level signal is transmitted on the CC pin of the Type-A port 1, the switch circuit 42 may be mistakenly switched to disconnect the CC communication channel.

During an exemplary implementation, in a case that the detection circuit 43 is the analog-to-digital conversion circuit, in an implementation, the switch circuit 42 includes an analog signal control switch, and the analog-to-digital conversion circuit is configured to first convert the fluctuating level signal transmitted on the CC pin of the Type-A port 1 into a digital signal, and output a stable analog signal according to the digital signal and send the stable analog signal to the switch circuit 42, so that the switch circuit 42 controls the switch status according to the stable analog signal. For example: it is assumed that the detection circuit includes an analog-to-digital converter (ADC) and an electrical signal output unit connected to the ADC, where the analog-to-digital converter is connected to the CC pin of the Type-A port 1, and when detecting that an electrical signal is transmitted on the CC pin of the Type-A port 1, the analog-to-digital converter generates a digital signal "1" and transmits the digital signal "1" to the electrical signal output unit, and the electrical signal output unit outputs a high-level signal in response to the digital signal "1", for example, 5V or 10V. In this case, the analog signal control switch of the switch circuit 42 connects the first terminal and the third terminal of the switch circuit 42 in response to the high-level signal. When detecting that no electrical signal is transmitted on the CC pin of the Type-A port 1, the analog-to-digital converter generates a digital signal "0" and transmits the digital signal "0" to the electrical signal output unit, and the electrical signal output unit outputs a low-level signal in response to the digital signal "0", for example, 0V. In this case, the analog signal control switch of the switch circuit 42 connects the first terminal and the second terminal of the switch circuit 42 in response to the low-level signal.

In another implementation, the switch circuit 42 includes a digital control switch, and the analog-to-digital conversion circuit is configured to convert the fluctuating level signal transmitted on the CC pin of the Type-A port 1 into a digital signal, and send the digital signal to the switch circuit 42, so that the switch circuit 42 controls the switch status according to the stable digital signal.

In a case that the detection circuit 43 is the integrator circuit, the integrator circuit may be an amplifier circuit, configured to adjust the fluctuating level signal transmitted on the CC pin of the Type-A port 1 into a relatively stable level signal or amplify the level signal on the CC pin of the Type-A port 1, and send the relatively stable level signal or the amplified level signal to the switch circuit 42, so that the switch circuit 42 controls the switch status according to the stable level signal or the amplified level signal.

In addition, working principles of the analog-to-digital conversion circuit and integrator circuit are the same as those of the analog-to-digital conversion circuit and the integrator circuit in the prior art, which is not repeated herein.

In this implementation, the analog-to-digital conversion circuit or the integrator circuit is configured to convert the signal transmitted on the CC pin of the Type-A port 1 into a control signal that is convenient for the switch circuit 42 to identify, which can improve the sensitivity of the switch circuit.

Further as shown in FIG. 3, the analog-to-digital conversion circuit 43 includes: an analog-to-digital conversion module 431, a third resistor 432, and a diode 433.

A first terminal of the analog-to-digital conversion module 431 is an input terminal of the analog-to-digital conversion circuit 43, a second terminal of the analog-to-digital conversion module 431 is an output terminal of the analog-to-digital conversion circuit 43, a third terminal of the analog-to-digital conversion module 431 is respectively connected to a first terminal of the third resistor 432 and a first terminal of the diode 433, a second terminal of the third resistor 432 is connected to the VBUS pin, and a second terminal of the diode 433 is connected to the GND pin.

In a case that a duration of transmitting a low-level signal on the CC pin of the Type-A port 1 is greater than or equal to a first preset time, or in a case that a duration of transmitting a high-level signal on the CC pin of the Type-A port 1 is less than a second preset time, the analog-to-digital conversion module 431 is configured to output a first control signal, and the switch circuit 42 is configured to connect the first terminal and the second terminal thereof in response to the first control signal; and in a case that the duration of transmitting the high-level signal on the CC pin of the Type-A port 1 is greater than or equal to the second preset time, or in a case that the duration of transmitting the low-level signal on the CC pin of the Type-A port 1 is less than the first preset time, the analog-to-digital conversion module 431 is configured to output a second control signal, and the switch circuit 42 is configured to connect the first terminal and the third terminal thereof in response to the second control signal.

During an exemplary implementation, the third resistor 432 and the diode 433 are configured to provide a power supply for the analog-to-digital conversion module 431, and the first preset time may be 2 seconds, 3 seconds, 5 seconds, or the like. The specific time length may be determined according to an application scenario of the data line. For example, in a case that a response time between the data line and the device to be charged is short, and a length of the first preset time may also be relatively short. In addition, when an interval time of a CC communication signal between the data line and an external device connected to the data line is relatively short, the length of the first preset time may also be relatively short.

In this way, after the analog-to-digital conversion module 431 detects that a low-level signal is transmitted on the CC pin of the Type-A port 1, the switch circuit 42 may be controlled to disconnect the CC communication channel after a first preset time length. In this way, after the data line provided in this application is connected to an external device or a power supply, in a case that the external device needs to first perform processes of identifying, generating, and transmitting a communication signal, and then performs CC communication by using the data line after a period of time; or during CC communication between the data line and the external device connected to the data line, in a case that a CC signal is a non-contiguous signal, and there is a time interval between two adjacent CC signals, in the embodiments of this application, the CC channel can be prevented from being disconnected within a time delay or a communication interval time of the external device, to improve the reliability of the CC communication channel of the data line.

In addition, the second preset time may be a relatively short time length, for example, 0.1 seconds, 0.5 seconds, or the like. The high-level signal of the time length may be a high-level signal falsely triggered by an electrical pulse signal.

In this way, in a case that the CC pin of the Type-A port 1 receives a high-level signal whose duration is less than or equal to the second preset time, the first terminal and the second terminal of the switch circuit are still connected, to avoid falsely triggering connection between the first terminal and the third terminal of the switch circuit, thereby improving the reliability of the DP/DM communication channel of the data line.

Figure 4:
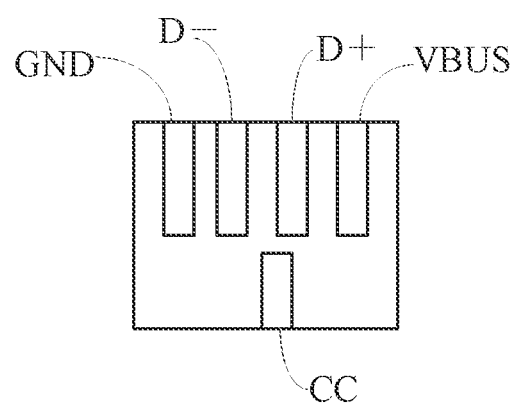
FIG. 4 is a structural diagram of a Type-A port in a data line according to an embodiment of this application.

In an exemplary implementation, as shown in FIG. 4, a first side of the Type-A port 1 is provided with the GND pin, the D+ pin, the D− pin, and the VBUS pin, a second side of the Type-A port 1 is provided with the CC pin, and the first side and the second side of the Type-A port 1 are two opposing sides.

In some embodiments, distribution positions of the pins of the Type-A port 1 may be exchanged or changed, which are not specifically limited herein. In addition, structures and working principles of the VBUS pin and the GND pin are the same as structures and working principles of the VBUS pin and the GND pin in the prior art, and details are not described herein again.

In this implementation, the CC pin is arranged on the second side of the Type-A port 1, so that structures and position distributions of the GND pin, the D+ pin, the D− pin, and the VBUS pin on the first side of the Type-A port 1 are the same as that in the Type-A port in the prior art, and the data line provided in the embodiments of this application is compatible with a conventional Type-A female socket.

In a case that the data line provided in the embodiments of this application is connected to a charger provided with the conventional Type-A female socket, because a CC pin is not arranged in the conventional Type-A female socket, the CC pin of the Type-A port 1 cannot receive a CC signal. In this case, the charging device supports only fasting charging of the DP/DM communication protocol.

The embodiments of this application further provided a charging device, including a charger and the data line provided by the foregoing embodiments. The charger includes a Type-A female socket matching the Type-A port of the data line, and the Type-A female socket includes: a VBUS pin, a CC pin, a D+ pin, a D− pin, and a GND pin.

The Type-A female socket matching the Type-A port of the data line may be understood as that: in a case that a Type-A port of a data line 2 is inserted into a Type-A female socket of a charger 1, a pin of the Type-A port is connected to a same pine of the Type-A female socket.

In addition, the charger further includes a PD charging module and a D+/D− charging module. In some embodiments, the PD charging module is connected to the CC pin and performs PD protocol communication with a device to be charged by using the CC pin, to support PD fast charging. The D+/D− charging module is connected to the D+ pin and the D− pin and performs DP/DM protocol communication with the device to be charged by using the D+ pin and the D− pin, to support DP/DM fast charging.

It should be noted that, in this implementation, a specific working process of the charging device corresponds to the working process of data line 2 in the foregoing embodiments, which is not repeated herein.

In addition, in a case that positions of the pins of the Type-A port are distributed as shown in FIG. 4, the Type-A female socket matching the Type-A port may further be connected to a Type-A port of a conventional data line, and in a case that the Type-A female socket of the charger is connected to the Type-A port of the conventional data line, only DP/DM protocol charging is supported.

In the embodiments of this application, the charging device has the Type-A port and supports PD protocol charging and DP/DM protocol charging, and has same effects as the data line provided in the embodiments of this applications. Details are not described herein again.

It should be noted that, terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "comprising one" does not exclude that there are still other same elements in the processes, methods, objects, or apparatuses. In addition, it should be noted that the scope of the method and device in the implementations of this application is not limited to performing functions in the order shown or discussed, but may also include performing, according to involved functions, the functions basically simultaneously or in a reverse order. For example, the described method may be performed a sequence different from the sequence described, and various steps may be added, omitted, or combined. In addition, features described with reference to some examples may be combined in other examples.

Through the descriptions of the foregoing implementations, a person skilled in the art may clearly understand that the method according to the foregoing embodiments may be implemented through software and a necessary general hardware platform, and may be implemented by hardware. Based on such understanding, the technical solutions of the embodiments of this application essentially or some contributing to the related art may be implemented in a form of a software product. The computer software product is stored in a storage medium, such as Read-Only Memory (ROM)/Random Access Memory (RAM), magnetic disk, or optical disc, and comprises several instructions for instructing a terminal device (which may be a mobile phone, a computer, a server, a network device, or the like) to perform the methods described in the embodiments of this application.

The embodiments of this application have been described above with reference to the accompanying drawings. This application is not limited to the embodiments described above, and the embodiments described above are merely exemplary and not limitative. Those of ordinary skill in the art may make various variations under the teaching of the present disclosure without departing from the spirit of this application and the protection scope of the claims, and such variations shall all fall within the protection scope of this application.

What is claimed is:

1. A data line, comprising:
   a Type-A port and a first port, wherein the Type-A port and the first port are connected by a cable, the Type-A port and the first port each comprises a VBUS pin, a CC pin, a D+ pin, a D− pin, and a GND pin, and the VBUS pin, the D+ pin, the D− pin, and the GND pin in the Type-A port are connected with the VBUS pin, the D+ pin, the D− pin, and the GND pin in the first port in one-to-one correspondence; and
   a circuit identification module, comprising a pull-up resistor, a switch circuit, and a detection circuit, wherein a first terminal of the switch circuit is connected to the CC pin of the first port, a second terminal of the switch circuit is connected to a first terminal of the pull-up resistor, a third terminal of the switch circuit is connected to the CC pin of the Type-A port, a second terminal of the pull-up resistor is connected to the VBUS pin of the first port, an input terminal of the detection circuit is connected to the CC pin of the Type-A port, and an output terminal of the detection circuit is connected to a control terminal of the switch circuit,
   wherein the first terminal of the switch circuit is controlled by the detection circuit to be connected to the second terminal or the third terminal of the switch circuit.

2. The data line according to claim 1, wherein the first port is a Type-C port.

3. The data line according to claim 1, wherein the circuit identification module is arranged in the cable, and a distance between the circuit identification module and one end of the first port is less than a distance between the circuit identification module and one end of the Type-A port.

4. The data line according to claim 1, wherein the switch circuit comprises a first switch transistor, a second switch transistor, a third switch transistor, a fourth switch transistor, a first resistor, and a second resistor,
   wherein a first electrode of the first switch transistor is the control terminal of the switch circuit, a second electrode of the first switch transistor is connected to a first electrode of the second switch transistor, a first electrode of the third switch transistor, and a first electrode of the fourth switch transistor, and a third electrode of the first switch transistor is connected to the GND pin of the first port;

the first electrode of the second switch transistor is further connected to the VBUS pin of the first port through the first resistor, a second electrode of the second switch transistor is the second terminal of the switch circuit, and a third electrode of the second switch transistor is the first terminal of the switch circuit;

a second electrode of the third switch transistor is the third terminal of the switch circuit, and a third electrode of the third switch transistor is connected to the second electrode of the first switch transistor through the second resistor; and a second electrode of the fourth switch transistor is connected to the third electrode of the second switch transistor, and a third electrode of the fourth switch transistor is connected to the third electrode of the third switch transistor, wherein when there is no signal on the CC pin of the Type-A port, the first switch transistor, the third switch transistor, and the fourth switch transistor are all in an off state, and the second switch transistor is in an on state; and when there is a signal on the CC pin of the Type-A port, the first switch transistor, the third switch transistor, and the fourth switch transistor are all in the on state, and the second switch transistor is in the off state.

5. The data line according to claim 4, wherein the first switch transistor and the second switch transistor are N-type transistors, and the third switch transistor and the fourth switch transistor are P-type transistors.

6. The data line according to claim 5, wherein the first switch transistor and the second switch transistor are NMOS transistors, and the third switch transistor and the fourth switch transistor are PMOS transistors.

7. The data line according to claim 1, wherein the switch circuit comprises a change-over switch, the first terminal of the switch circuit is a non-movable terminal of the change-over switch, and both the second terminal and the third terminal of the switch circuit are movable terminals of the change-over switch.

8. The data line according to claim 1, wherein the detection circuit is an analog-to-digital conversion circuit or an integrator circuit.

9. The data line according to claim 8, wherein the analog-to-digital conversion circuit comprises: an analog-to-digital conversion module, a third resistor, and a diode, wherein a first terminal of the analog-to-digital conversion module is an input terminal of the analog-to-digital conversion circuit, a second terminal of the analog-to-digital conversion module is an output terminal of the analog-to-digital conversion circuit, a third terminal of the analog-to-digital conversion module is respectively connected to a first terminal of the third resistor and a first terminal of the diode, a second terminal of the third resistor is connected to the VBUS pin, and a second terminal of the diode is connected to the GND pin, when a duration of transmitting a low-level signal on the CC pin of the Type-A port is greater than or equal to a first preset time, or when a duration of transmitting a high-level signal on the CC pin of the Type-A port is less than a second preset time, the analog-to-digital conversion module is configured to output a first control signal, and the switch circuit is configured to connect the first terminal and the second terminal thereof in response to the first control signal; and when the duration of transmitting the high-level signal on the CC pin of the Type-A port is greater than or equal to the second preset time, or when the duration of transmitting the low-level signal on the CC pin of the Type-A port is less than the first preset time, the analog-to-digital conversion module is configured to output a second control signal, and the switch circuit is configured to connect the first terminal and the third terminal thereof in response to the second control signal.

10. A charging device, comprising:

a data line, comprising:

a Type-A port and a first port, wherein the Type-A port and the first port are connected by a cable, the Type-A port and the first port each comprises a VBUS pin, a CC pin, a D+ pin, a D− pin, and a GND pin, and the VBUS pin, the D+ pin, the D− pin, and the GND pin in the Type-A port are connected with the VBUS pin, the D+ pin, the D− pin, and the GM) pin in the first port in one-to-one correspondence; and a circuit identification module, comprising a pull-up resistor, a switch circuit, and a detection circuit, wherein a first terminal of the switch circuit is connected to the CC pin of the first port, a second terminal of the switch circuit is connected to a first terminal of the pull-up resistor, a third terminal of the switch circuit is connected to the CC pin of the Type-A port, a second terminal of the pull-up resistor is connected to the VBUS pin of the first port, an input terminal of the detection circuit is connected to the CC pin of the Type-A port, and an output terminal of the detection circuit is connected to a control terminal of the switch circuit, wherein the first terminal of the switch circuit is controlled by the detection circuit to be connected to the second terminal or the third terminal of the switch circuit; and a charger comprising:

a Type-A female socket matching the Type-A port of the data line, wherein the Type-A female socket comprises: a VBUS pin, a CC pin, a D+ pin, a D− pin, and a GND pin.

11. The charging device according to claim 10, wherein the first port is a Type-C port.

12. The charging device according to claim 10, wherein the circuit identification module is arranged in the cable, and a distance between the circuit identification module and one end of the first port is less than a distance between the circuit identification module and one end of the Type-A port.

13. The charging device according to claim 10, wherein the switch circuit comprises a first switch transistor, a second switch transistor, a third switch transistor, a fourth switch transistor, a first resistor, and a second resistor, wherein a first electrode of the first switch transistor is the control terminal of the switch circuit, a second electrode of the first switch transistor is connected to a first electrode of the second switch transistor, a first electrode of the third switch transistor, and a first electrode of the fourth switch transistor, and a third electrode of the first switch transistor is connected to the GND pin of the first port;

the first electrode of the second switch transistor is further connected to the VBUS pin of the first port through the first resistor, a second electrode of the second switch transistor is the second terminal of the switch circuit, and a third electrode of the second switch transistor is the first terminal of the switch circuit;

a second electrode of the third switch transistor is the third terminal of the switch circuit, and a third electrode of the third switch transistor is connected to the second electrode of the first switch transistor through the second resistor; and a second electrode of the fourth switch transistor is connected to the third electrode of the second switch transistor, and a third electrode of the fourth switch transistor is connected to the third electrode of the third switch transistor, wherein when there is no signal on the CC pin of the Type-A port, the first switch transistor, the third switch transistor, and the fourth switch transistor are all in an off state, and the second switch transistor is in an on state; and when there is a signal on the CC pin of the Type-A port, the first switch transistor, the third switch transistor, and the fourth switch transistor are all in the on state, and the second switch transistor is in the off state.

14. The charging device according to claim 13, wherein the first switch transistor and the second switch transistor are N-type transistors, and the third switch transistor and the fourth switch transistor are P-type transistors.

15. The charging device according to claim 14, wherein the first switch transistor and the second switch transistor are NMOS transistors, and the third switch transistor and the fourth switch transistor are PMOS transistors.

16. The charging device according to claim 10, wherein the switch circuit comprises a change-over switch, the first terminal of the switch circuit is a non-movable terminal of the change-over switch, and both the second terminal and the third terminal of the switch circuit are movable terminals of the change-over switch.

17. The charging device according to claim 10, wherein the detection circuit is an analog-to-digital conversion circuit or an integrator circuit.

18. The charging device according to claim 17, wherein the analog-to-digital conversion circuit comprises: an analog-to-digital conversion module, a third resistor, and a diode, wherein a first terminal of the analog-to-digital conversion module is an input terminal of the analog-to-digital conversion circuit, a second terminal of the analog-to-digital conversion module is an output terminal of the analog-to-digital conversion circuit, a third terminal of the analog-to-digital conversion module is respectively connected to a first terminal of the third resistor and a first terminal of the diode, a second terminal of the third resistor is connected to the VBUS pin, and a second terminal of the diode is connected to the GND pin, when a duration of transmitting a low-level signal on the CC pin of the Type-A port is greater than or equal to a first preset time, or when a duration of transmitting a high-level signal on the CC pin of the Type-A port is less than a second preset time, the analog-to-digital conversion module is configured to output a first control signal, and the switch circuit is configured to connect the first terminal and the second terminal thereof in response to the first control signal; and when the duration of transmitting the high-level signal on the CC pin of the Type-A port is greater than or equal to the second preset time, or when the duration of transmitting the low-level signal on the CC pin of the Type-A port is less than the first preset time, the analog-to-digital conversion module is configured to output a second control signal, and the switch circuit is configured to connect the first terminal and the third terminal thereof in response to the second control signal.

* * * * *